March 22, 1960 K. H. ANDREN 2,929,136
WIRE LENGTH MEASURING, MARKING AND SEVERING EQUIPMENT
Filed Aug. 10, 1955 10 Sheets-Sheet 1
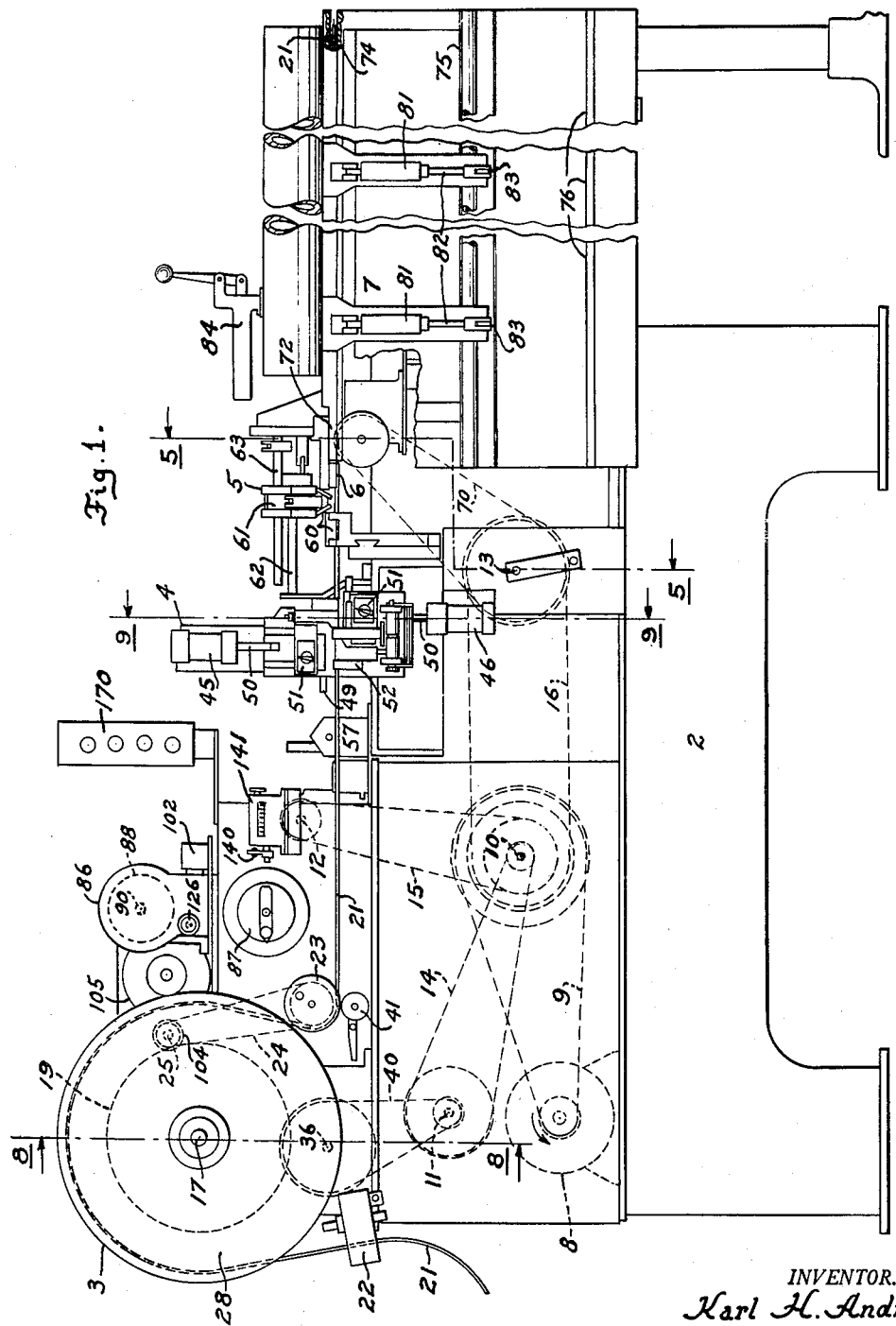
INVENTOR.
Karl H. Andren
BY
Lieber & Lieber
Attorney March 22, 1960    K. H. ANDREN    2,929,136
WIRE LENGTH MEASURING, MARKING AND SEVERING EQUIPMENT
Filed Aug. 10, 1955    10 Sheets-Sheet 2

INVENTOR.
Karl H. Andren
BY
Lieber & Lieber
Attorney

March 22, 1960     K. H. ANDREN     2,929,136
WIRE LENGTH MEASURING, MARKING AND SEVERING EQUIPMENT
Filed Aug. 10, 1955     10 Sheets-Sheet 3
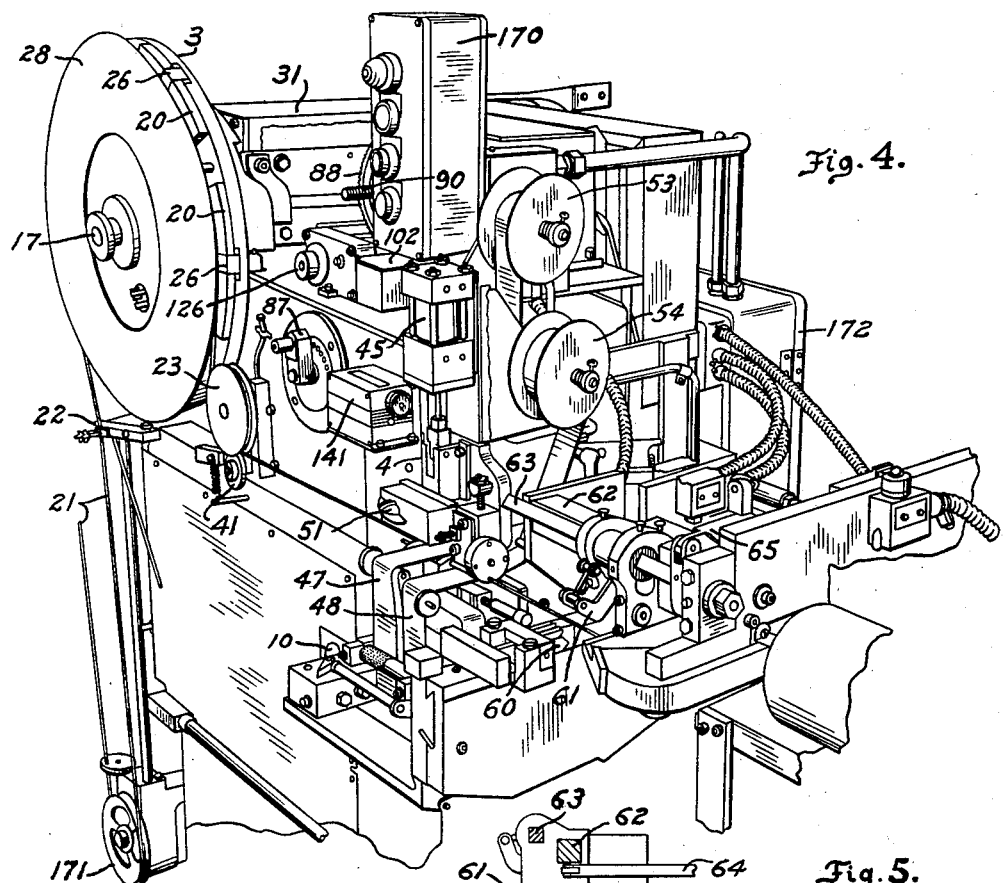
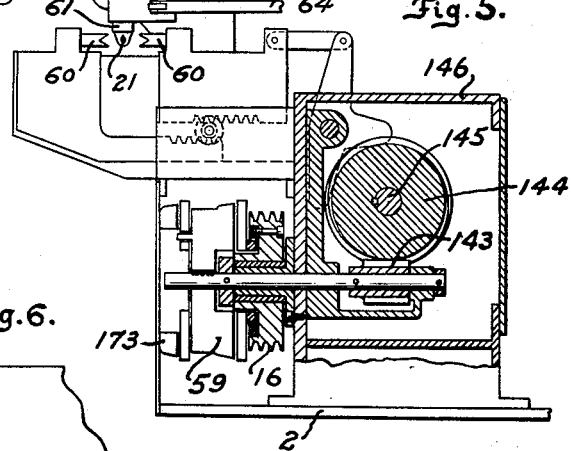
INVENTOR.
Karl H. Andren
BY
Lieber & Lieber
Attorney

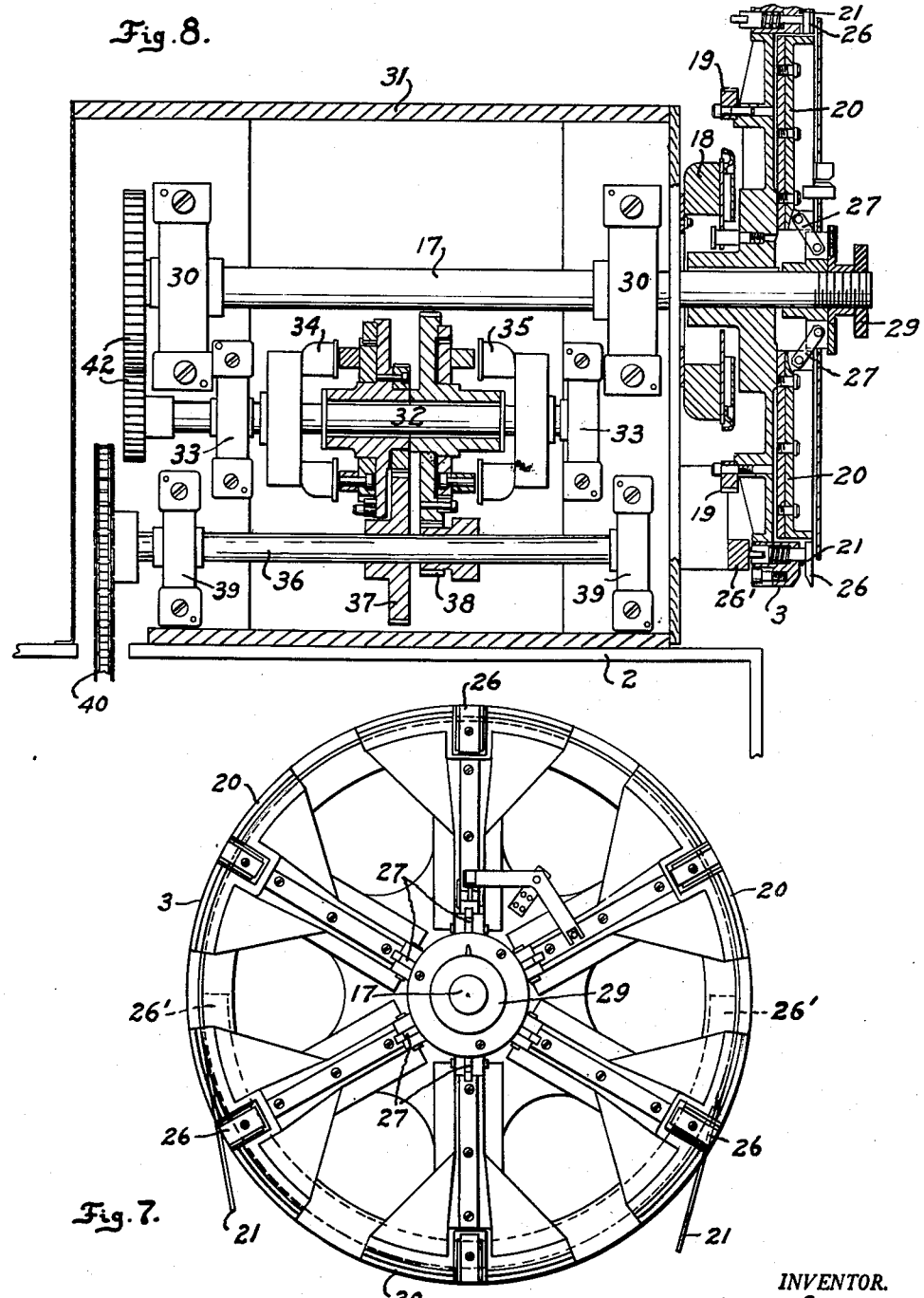

March 22, 1960 K. H. ANDREN 2,929,136
WIRE LENGTH MEASURING, MARKING AND SEVERING EQUIPMENT
Filed Aug. 10, 1955 10 Sheets-Sheet 5
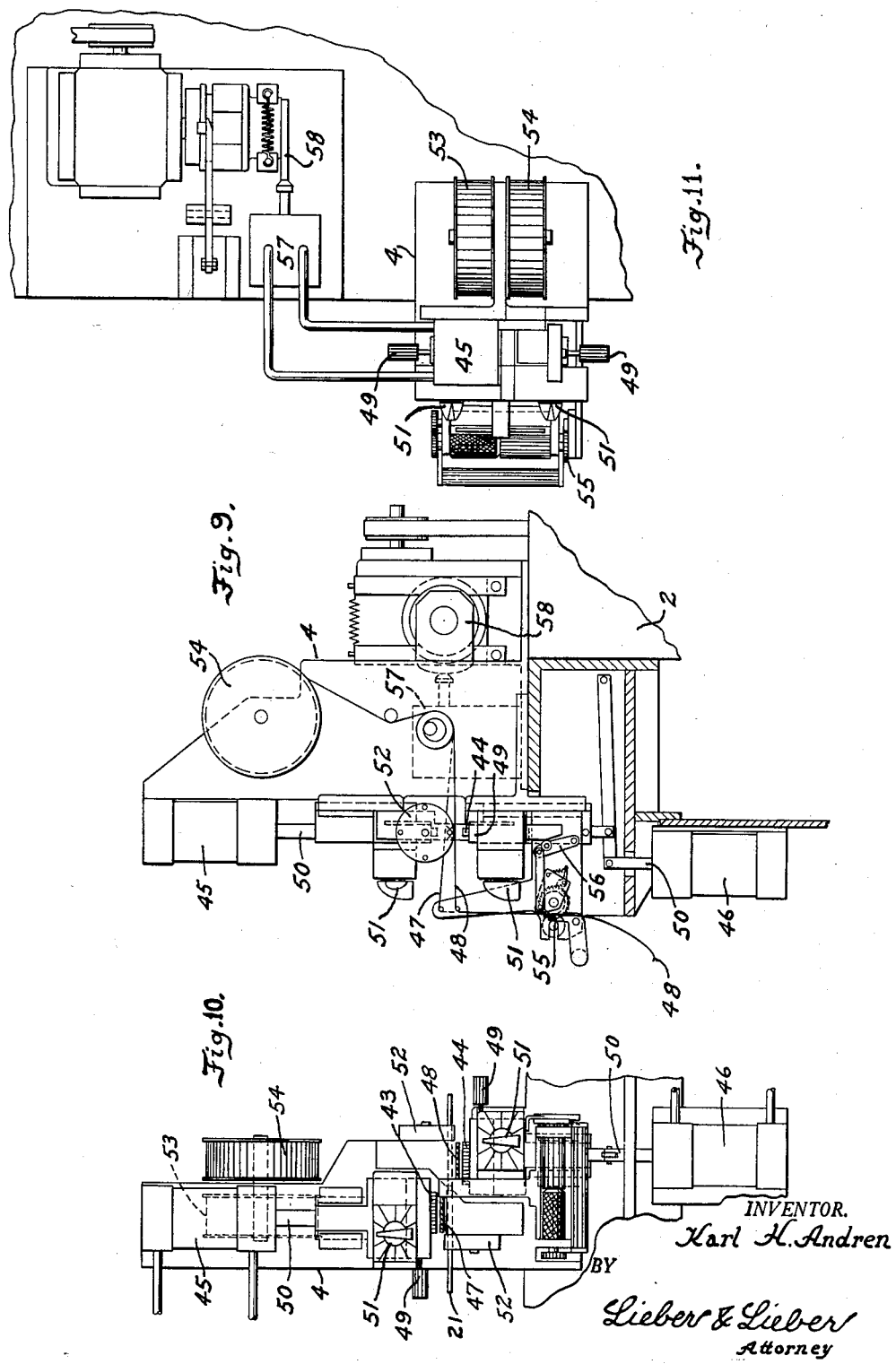
INVENTOR.
Karl H. Andren
BY
Lieber & Lieber
Attorney March 22, 1960 K. H. ANDREN 2,929,136
WIRE LENGTH MEASURING, MARKING AND SEVERING EQUIPMENT
Filed Aug. 10, 1955 10 Sheets-Sheet 6
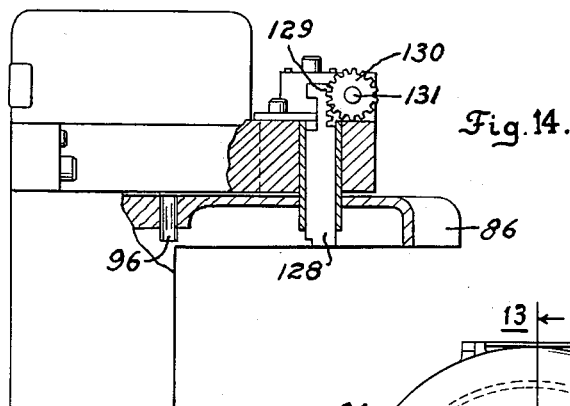
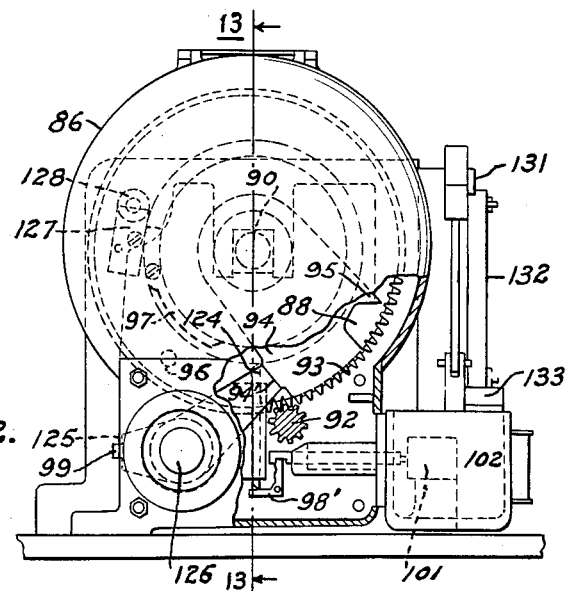
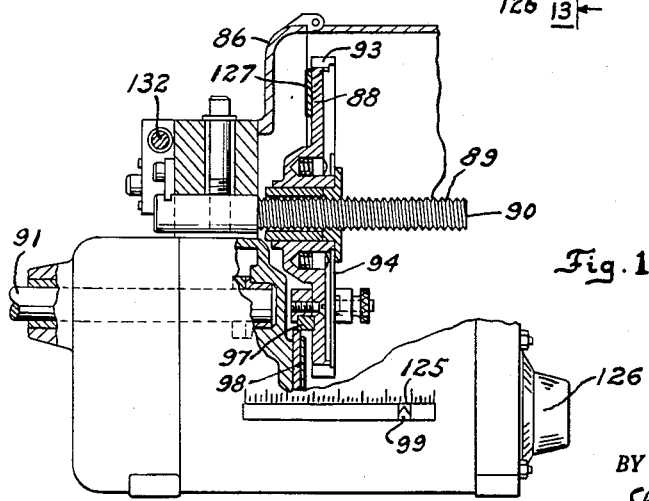
INVENTOR.
Karl H. Andren
BY
Lieber & Lieber
Attorney

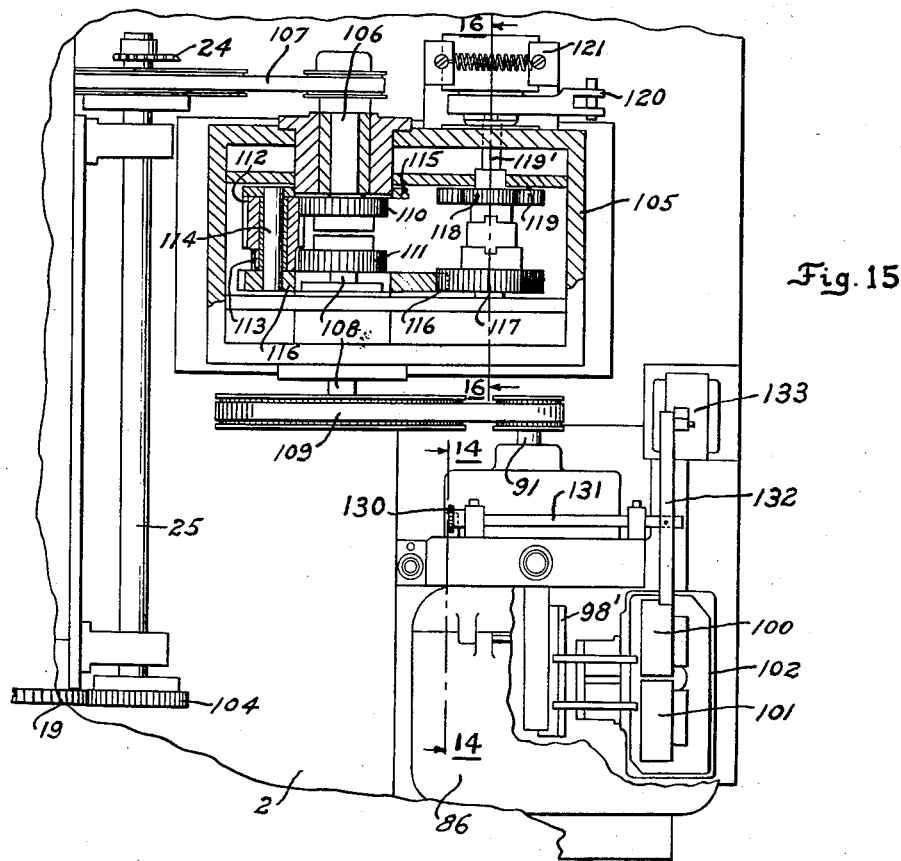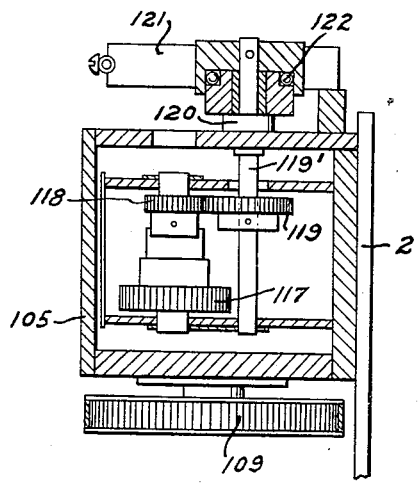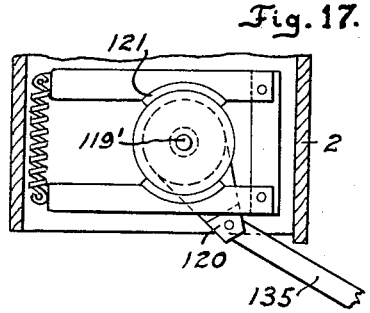

March 22, 1960  K. H. ANDREN  2,929,136
WIRE LENGTH MEASURING, MARKING AND SEVERING EQUIPMENT
Filed Aug. 10, 1955  10 Sheets-Sheet 8
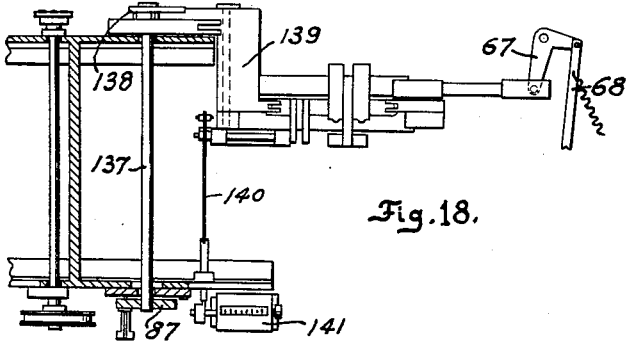
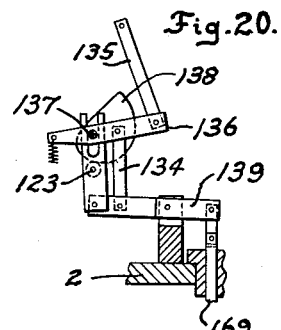
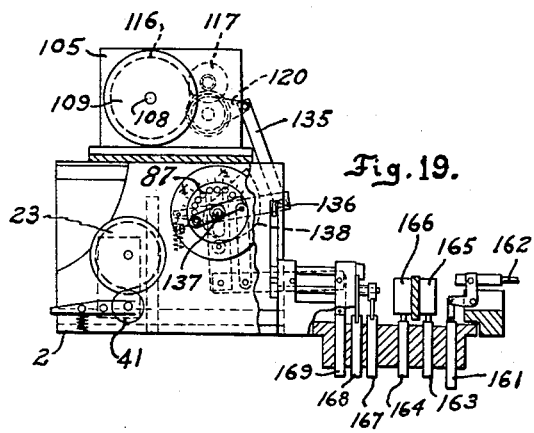
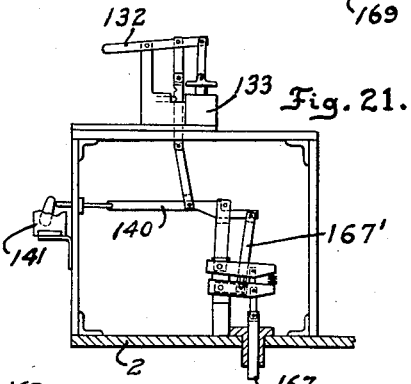
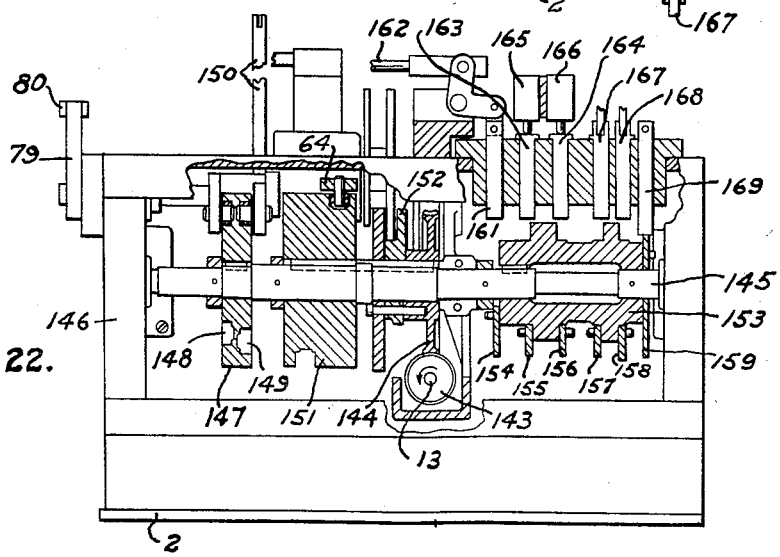
INVENTOR.
Karl H. Andren
BY
Lieber & Lieber
Attorney March 22, 1960　　　K. H. ANDREN　　　2,929,136
WIRE LENGTH MEASURING, MARKING AND SEVERING EQUIPMENT
Filed Aug. 10, 1955　　　　　　　　　　　　　10 Sheets-Sheet 9

INVENTOR.
Karl H. Andren
BY
Lieber & Lieber
Attorney

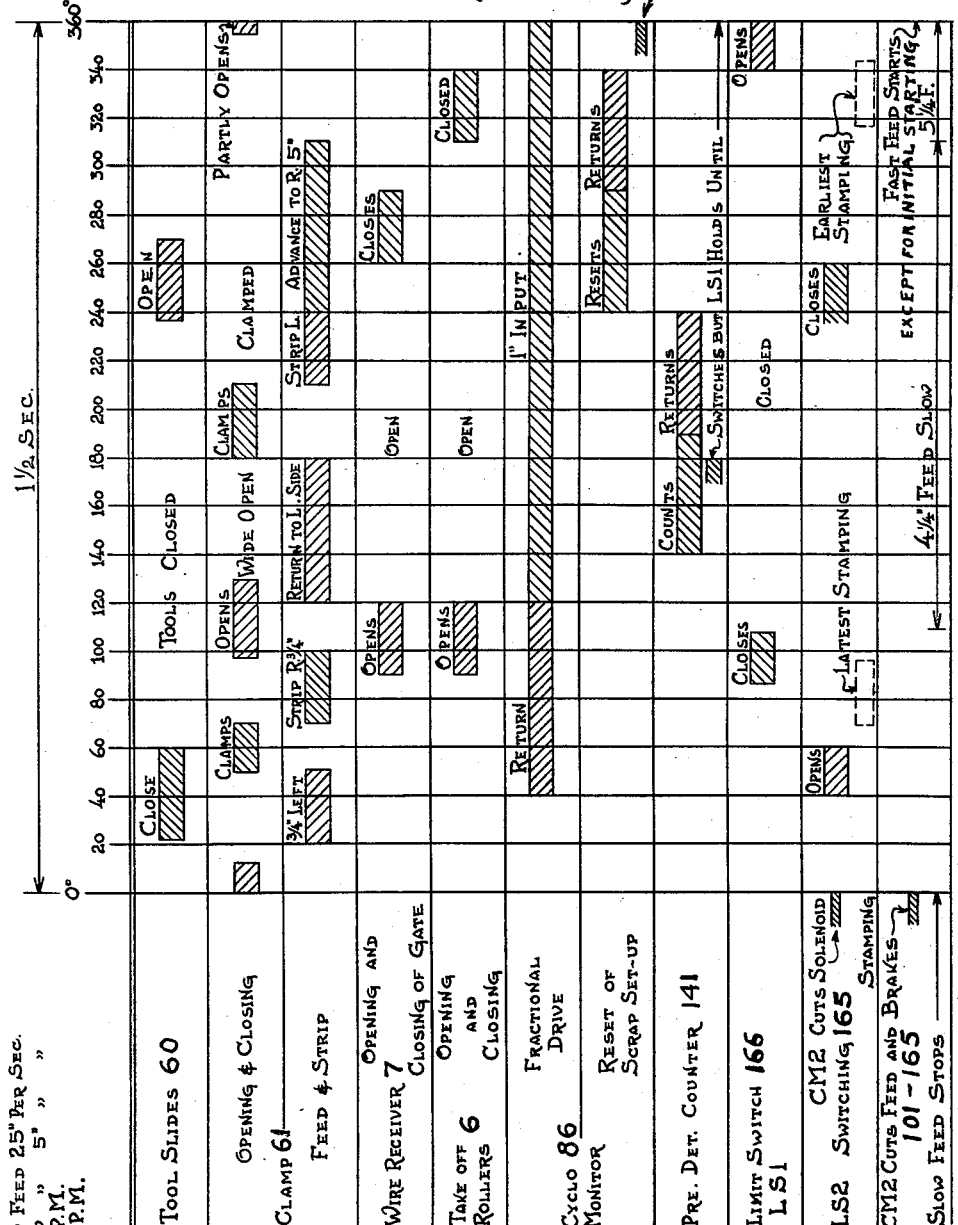

United States Patent Office 2,929,136
Patented Mar. 22, 1960

2,929,136

WIRE LENGTH MEASURING, MARKING AND SEVERING EQUIPMENT

Karl H. Andren, West Allis, Wis., assignor to Artos Engineering Company, Milwaukee, Wis., a corporation of Wisconsin Application August 10, 1955, Serial No. 527,592

9 Claims. (Cl. 29—417)

The present invention relates generaly to improvements in the art of measuring successive sections of elongated material and of subjecting each section to one or more operations in order to condition the same for subsequent usage; and it relates more specifically to an improved method of and apparatus for automatically paying out successive definite lengths of wire stock from a source of supply, for severing each measured length from the source and marking the same locally with identifying indicia, and for delivering the finished wire lengths from the zones of severance and marking.

The primary object of this invention is to provide an improved method of accurately producing successive lengths of longitudinally advancing wire stock and of performing one or more operations on each wire length in order to identify the same for future use, and to also provide simple and efficient mechanism adapted to automatically and rapidly carry on the successive steps of the improved method with utmost precision.

Some of the more important specific objects of the invention may be enumerated as follows:

To provide an improved system for automatically feeding insulated wire longitudinally along a definite path and for applying identifying indicia thereto while also cutting it into predetermined sections or lengths and stripping the insulation from at least one end of each severed length.

To provide improved equipment for rapidly, accurately and economically measuring, printing, cutting, and stripping successive sections of insulated wire stock, and which is safely and easily operable to precisely vary the lengths and the number of sections of the desired length produced as well as the magnitude of the stripipngs.

To provide an improved machine of compact and durable construction capable of accurately and automatically producing successive equal lengths of insulated wires in any desired small or large quantity from a continuous stock payout source, so that all of the successive lengths are identical and bear identifying indicia applied locally thereto at similar preselected intervals.

To provide an improved assemblage for continuously producing a succession of accurately measured lengths or sections of wire stock of various gauges in lots of any predetermined number, with minimum waste of stock and with least attention after the assemblage has been set-up for any desired type of production.

To provide improved instrumentalities for automatically repeating the cycle of measuring, stamping and cutting a continuous longitudinally advancing wire into successive lengths while travelling at high speed, and for automatically arresting the mechanism whenever the predetermined quantity of pieces have been completed To provide improved mechanism for severing and stripping one or both ends of successive lengths of insulated wires, and for stamping identifying characters on the opposite sides of each length in more closely spaced relation near each end of each wire length than at the medial portion thereof.

To provide a wire marking device for lengths of insulated wire, in which the marking indicia can be conveniently altered as to character and relative spacing or position; and which is especially adapted for the production of marked electrical conductors such as used in the aircraft industry in relatively inaccessible places and in bunched relation to other conductors.

To provide a machine for applying identifying indicia to insulated electric wires which are normally installed in cramped quarters and must frequently be renewed or replaced, so that the identity of each wire will be readily visible and replacement thereof greatly facilitated.

To provide a wire severing and marking unit adapted to produce successive locally marked wire sections of great length from a continuous source of supply, and in which the mechanism is automatically stopped whenever the supply is interrupted or when the wire supply is locally defective or knotted.

To provide a smoothly functioning automatic wire marking, cutting and stripping assembly, wherein all functions required for subsequent operation may be changed after the mechanism has stopped upon completion of a previous run, without necessitating manual manipulation of the machine.

These and other more specific objects and advantages of the invention will be apparent from the following detailed description.

A clear conception of the several steps involved in the improved system and of the construction and operation of a commercial machine for exploiting the invention, may be had by referring to the drawings accompanying and forming a part of this specification wherein like reference characters designate the same or similar parts in the various views.

Fig. 1 is a fragmentary front view of a typical machine for producing successive lengths of insulated wire from a continuous supply of longitudinally advancing wire stock and for marking each length with identifying indicia;

Fig. 4 is a front and end perspective view of the wire feeding, stamping, and cutting and stripping mechanisms of the machine.

Fig. 5 is a transverse vertical section through the drive for the cutting and stripping unit, taken along the line 5—5 of Fig. 1;

Fig. 6 is a vertical section through the friction clutch which drives the take off rollers, looking toward the front of the machine;

Fig. 7 is a front view of the wire stock feed wheel, with the front closure cover removed;

Fig. 8 is a central vertical section through the wire stock feed wheel and its driving mechanism, taken along the line 8—8 of Fig. 1;

Fig. 9 is a transverse vertical section through the wire marking or stamping unit, taken along the line 9—9 of Fig. 1;

Fig. 10 is a front view of the wire marking or stamping unit;

Fig. 11 is a top view of the wire marking or stamping unit;

Fig. 12 is a part sectional front view of the wire length measuring unit, for measuring full inches;

Fig. 13 is a fragmentary transverse vertical section through the wire length measuring unit, taken along the line 13—13 of Fig. 12;

Fig. 14 is a fragmentary vertical section through the wire length measuring unit, taken along the line 14—14 of Fig. 15;

Fig. 15 is a horizontal section through the wire length measuring unit driven mechanism;

Fig. 16 is a vertical section through the driving mechanism of Fig. 15, taken along the line 16—16 of Fig. 15;

Fig. 17 is a fragmentary rear view of the wire length measuring unit showing portions of the driving connections from the wire length measuring unit to the fractional inch operating drive;

Fig. 18 is a top sectional view of the fractional inch wire length measuring unit and of the predetermined number counter;

Fig. 19 is a front sectional view of the wire length measuring and counting mechanisms, showing a section through the mounting of the cam actuated plungers for effecting operation of these and other mechanisms of the machine;

Fig. 20 is a fragmentary view also showing one of the cam actuated plungers for controlling the actuation of the wire length measuring units;

Fig. 21 is an additional fragmentary view showing the cam actuated plunger and linkage for operating the predetermined counter and the mechanism for setting the machine for initial scrap cutting;

Fig. 22 is an enlarged vertical section through the cams and cam actuated plungers for effecting actuation of the various units of the machine, the section being taken along the line 22—22 of Fig. 2, and the plungers being viewed in a direction opposite to that of Fig. 19;

Fig. 26 is a timing diagram depicting the several steps involved in the production of the final conductors during each cycle of operation of the machine, including the initial step of squaring the leading end of the wire stock during starting.

The present improved method of measuring, marking and severing involves the steps of feeding wire stock longitudinally past a definite zone, applying identifying indicia or markings in spaced relation to the wire stock at said zone, cutting the stock into predetermined length or sections at the zone, and removing the successive finished wire sections from the zone of marking and severance.

Figures 2, 3:
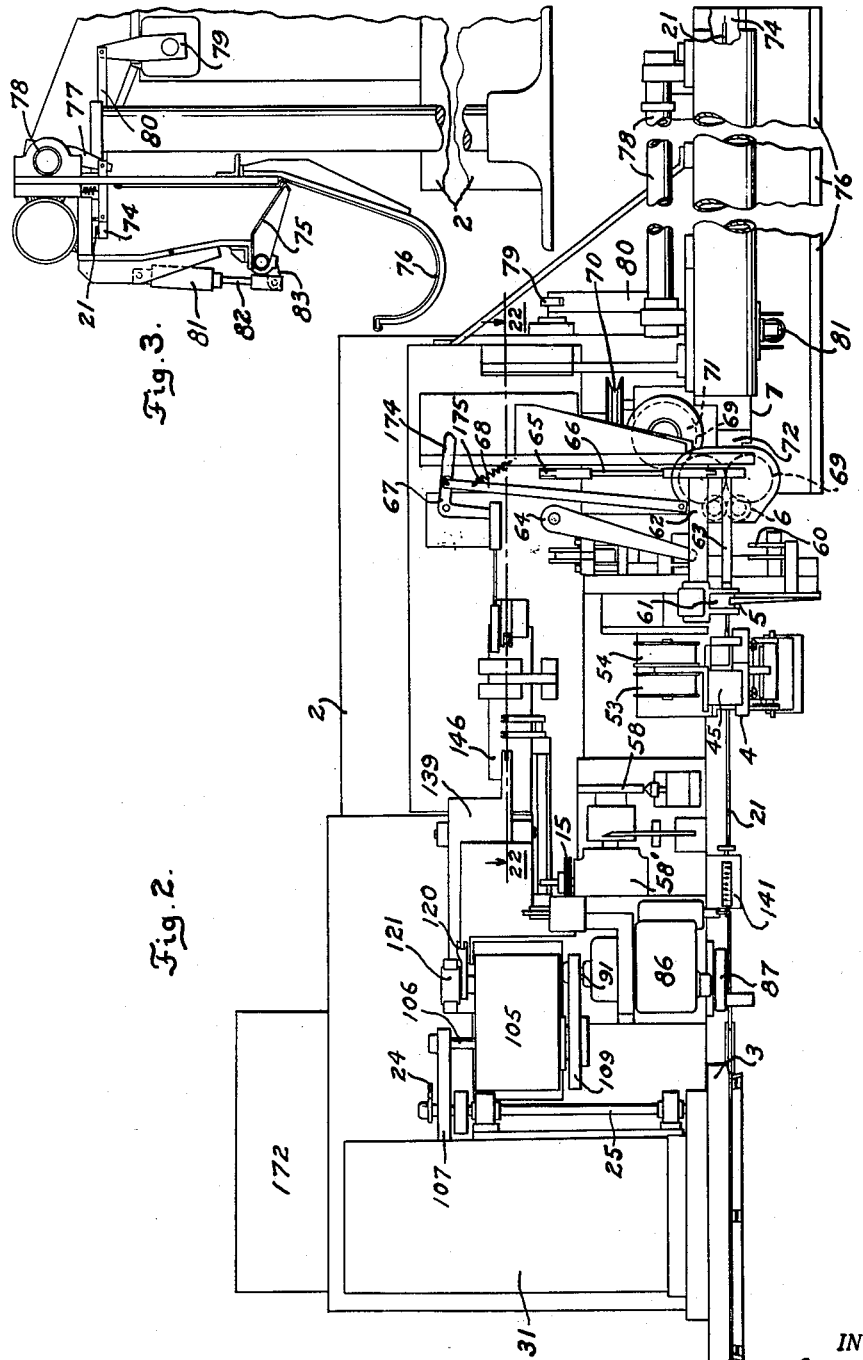
Fig. 2 is a fragmentary top view of the machine shown in Fig. 1.
Fig. 3 is a fragmentary end view of the same machine.

The typical mechanism for automatically carrying on the steps of the improved method, shown in the drawings, comprises in general a main frame 2 providing a support for a rotary wire feed member or pay-out wheel 3, a marking or indicia stamping unit 4, a cutting and stripping device 5, a set of wire length take-off elements or rollers 6, a finished wire length receiver 7, and wire length measuring counting and timing mechanisms cooperable with the wheel 3, unit 4, device 5 and rollers 6, see Figs. 1 to 3 inclusive. All of these primary parts of the mechanism are adapted, to be actuated by a common electric motor 8 also mounted upon the frame 2, and which is provided with an automatic brake and is drivingly connected by means of an endless drive 9 with a main power shaft 10 journalled in the frame 2 and from which several other shafts 11, 12, 13 which are journalled in auxiliary casings or frames, are normally driven through auxiliary endless drives 14, 15, 16 respectively.

As shown in Figs. 1, 7, 8 and 25, the wire feeding rotor or pay-out wheel 3 has its inner portion or hub secured to a transverse drive shaft 17 and cooperable with an electro-magnetic brake 18, while its medial portion is provided with a ring gear 19, and its outer portion or periphery carries an annular series of radially adjustable wire engaging segments 20. The electro-magnetic brake 18 is adapted to momentarily arrest the rotation of the wheel 3 whenever a predetermined length of perfect insulated wire 21 has been fed past a defect detector 22 from a source of wire supply, or when a wire defect such as a splice or knot passes through the detector 22, and the wire 21 which is delivered or paid out from the wheel 3 engages a guide wheel 23 which is rotatable by an endless chain drive 24 driven through a shaft 25 from the ring gear 19. Fixedly mounted upon the feed wheel 3 is an annular series of wedge shaped wire clamps 26, and all of the segments 20 are adapted to be simultaneously moved either toward or away from the shaft 17 and relative to the clamps 26 in order to vary the effective diameter and to cause the wheel 3 to properly coact with wires 21 of different diameters, with the aid of toggle links 27 secured to the segments 20 and to a member 29 adjustable along the shaft 17. The clamps 26 are resiliently mounted and formed to clampingly cooperate with wires of different diameters, and these clamps 26 are opened periodically by a cam 26' as the wheel 3 revolves. The wheel 3 is also preferably provided with a closure plate 28 for covering the clamps 26 and the segments 20.

Figure 24:
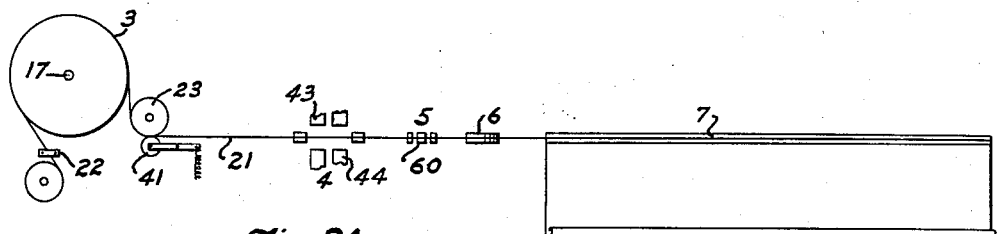
Fig. 24 is a side view diagram also depicting the advancement of the wire as in Fig. 23.
Figure 25:
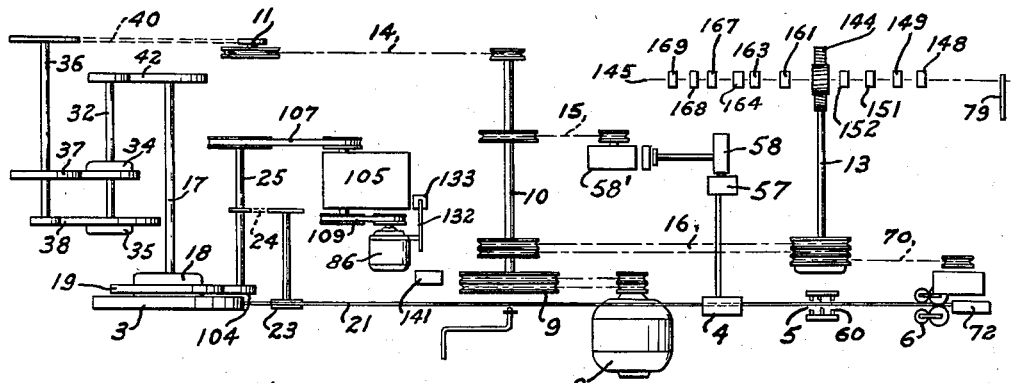
Fig. 25 is a diagrammatic top view of the several wire handling and treating units showing the driving mechanisms therefor.

The transverse shaft 17 which supports the pay-out wheel 3 is journalled in bearings 30 mounted within a gear box 31, and has its end remote from the wheel 3 connected by gearing 42 to a counter shaft 32 also journalled in bearings 33 within the housing or gear box 31. A pair of high and low speed electro-magnetic driving clutches 34, 35, respectively, is associated with the counter shaft 32 between the bearings 33, and these clutches are adapted to alternately drivingly connect the counter shaft 32 with a jack shaft 36 through high and low speed transmission gears 37, 38, respectively, as illustrated in Figs. 8 and 25. The jack shaft 36 is likewise journalled in bearings 39 within the gear box 31, and has a sprocket at one end which is connected by an endless drive 40 with the counter shaft 11 journalled in the frame 2 as shown in Fig. 1. The wire stock 21 fed and controlled by the feed wheel 3 and in which the slack is constantly taken up by the take-off rollers 6 may thus be advanced longitudinally about the feed wheel periphery and delivered past the guide wheel 23 at high speed for long or widely spaced markings or at slow speed for closer marking spacing depending upon the actuation of the clutches 34, 35; and a press roll 41 may also be caused to cooperate with the guide wheel 23 as shown in Figs. 1 and 24.

The marking or indicia applying unit 4 which is mounted upon the frame 2 some distance from the feed wheel 3 is shown in Figs. 1, 2, 4, 9, 10, 11, 23, 24 and 25, and comprises in general, a pair of upper and lower electrically heated dies or type sets 43, 44 respectively cooperating with normally fixed anvils, adapted to be intermittently but simultaneously moved toward diametrically vertically opposed local portions of the wire 21 by means of air cylinders 45, 46, and to coact with ink coated ribbons 47, 48 respectively to apply local identifying indicia to the wire at accurately spaced top and bottom localities. The type sets 43, 44 are mounted in detachable holders 49 secured to the rods 50 of plungers movable within the cylinders 45, 46, and are adapted to be heated with the aid of adjustable heat regulators 51, and the wire 21 is conducted between the type sets by means of rotatably adjustable guides adapted to accommodate wires of different diameters. The type sets 43, 44 and cylinders 45, 46 are off-set laterally in order to stagger the prints and the printing ribbons 47, 48 are adapted to be intermittently withdrawn from supply rolls 53, 54, respectively, and about guide rollers above and beneath the wire 21, by means of a feed clutch 55 and an oscillatory lever arm 56, and the reciprocation of the type sets 43, 44 is controlled by an air valve 57 which is operable by a cam 58 driven from the shaft 10 through the drive 15 and a speed reducer 58' provided with solenoid operated control clutch for stopping the stamping unit 4 whenever the feed wheel 3 stops.

The wire cutting and stripping device 5 is of relatively well known construction as shown in Patent No. 2,680,394, granted June 8, 1954, and comprises two cooperating sets of wire severing and insulation cutting and removing blades 60, and a single wire clamp 61 movable along a guide rod 62 and having clamping jaws adapted to be opened and closed by means of an oscillatory polygonal shaft 63, see Figs. 1, 2 and 5. The knife blades 60 are mounted in slides as in Patent No. 2,680,394, granted June 8, 1954, and are periodically movable toward the wire 21 whenever a predetermined length of the insulated wire stock has been advanced past the marking unit 4 by the feed wheel 3 and the take-off rollers 6. The clamp 61 is movable back and forth through the cutting and stripping zone, and the clamping jaws are adapted to be opened and closed by means of a lever 65 and a connection 66 coacting with the polygonal shaft 63, see Figs. 4 and 5. Both the arm 64 and the lever 65 are operable by cams in a manner to be later explained, but the normal functioning of the cutting and stripping device 5 is such that after a wire length has been payed out and the cutting and stripping blades 60 have closed, the central blades thereby cutting through the wire completely and the end blades severing the insulating only, the clamp 61 is actuated to engage the right hand wire section and to pull toward the rollers 6 so as to strip the insulation from the trailing end of the severed wire length thereby completing a conductor. The clamp 61 then opens releasing the finished conductor, and while blades 60 remain closed the clamp with its jaws spread moves toward the left past the cutting and stripping zone and thereafter engages the leading end of the wire stock 21 and pulls it toward the left to strip this leading end. The blades 60 then separate whereupon the clamp 61 pulls the stripped end of the stock and inserts it between the separated take-off rollers 6.

The set of finished wire length take-off rollers 6 are rubber covered to frictionally but firmly engage each of the successive marked and stripped sections after it has been released by the clamp 61 and these rollers 6 are engageable with horizontal diametrically opposite sides of each wire length mid-way between the markings thereon, and are separable whenever the clamp 61 is approaching so as to facilitate introduction of the leading end of the longitudinally advancing wire therebetween. This separation of the rollers is effected by a bell-crank 67 and a link 68 operable by a cam as will be later explained, and the rollers 6 are rotatable in opposite directions by spur gearing 69 and an endless drive 70 drivingly connecting the shaft 13 with the gearing 69 through a friction clutch 71, as depicted in Figs. 1, 2 and 6. Associated with the delivery side of the take-off rollers 6 is a guide conduit 72 which provides a straight passage for conducting the successive longitudinally advancing finished wire length or sections toward the final discharge means 7 in rectilinear condition and without bending or kinking these sections.

As illustrated in Figs. 1, 2 and 3, the final wire length discharge means 7 comprises an upper shelf 74 adapted to receive the successive wire lengths from the guide conduit 72, an intermediate support 75 adapted to receive an accumulation of finished wire lengths by gravity from the upper shelf 74, and a lower trough 76 adapted to likewise receive an accumulation of the final product from the support 75. The upper shelf 74 is periodically laterally removable to dump its load, by means of an arm 77 secured to an oscillatory shaft 78 and which is operable by a lever 79 and a link 80; an the intermediate support 75 is likewise periodically downwardly swingable by means of several air cylinders 81 pivotally suspended from a front wall of the main frame 2 and having plungers 82 connected to levers 83 secured to the pivoted end of the support 75. The lower trough 76 is forwardly open to permit ready removal of the final wire lengths and is also of sufficient length to accommodate the longest product, and has ample capacity to hold a considerable number of wire sections, and the air cylinders 81 are controllable by means of a manually manipulable valve 84.

The several mechanisms for accurately predetermining the length of each of the successive sections severed from the wire stock 21 and the spacing of the stampings or markings, includes a main so-called "Cyclo-Monitor" unit 86 for accurately measuring the lengths of the successive sections of wire stock in full inches, and an auxiliary unit 87 cooperating with the main unit 86 for accurately measuring fractional inches involved in addition to such full inches. The main automatic length measuring unit 86 is of the general type shown in Figs. 12, 13 and 14, and in Patent No. 2,489,474, granted November 29, 1949, and comprises a counting and timing wheel or rotor 88 having internal screw threads coacting with external threads 89 on a fixed supporting shaft 90; a rotary drive shaft 91 connected through clutches and gearing with a pinion 92 meshing with peripheral teeth 93 formed on the rotor 88; and an angularly adjustable plate 94 carried by the rotor 88 and having a pointer 95 cooperable with inch calibrations on one face of the rotor for predetermining the extent of circumferential movement of the revolving rotor 88 about the screw threads 89. A stop plate 127 carried by the rotor 88 coacts both with a stop pin 96 mounted on the housing 86 and with a retractable axially movable shaft 128 also carried by the housing 86, and which is provided with rack teeth 129 coacting with a pinion 130 carried by a transverse shaft 131 as shown in Figs. 12, 14 and 15, and the shaft 131 is connected by linkage 132 with a solenoid 133 which controls the movement of the shaft 128.

The adjustable plate 94 remote from the pointer 95 has an abutment 94' adapted to strike a plate 124 having a pointer 99 movable parallel to the shaft 90 by means of a screw threaded adjusting member 126, and this pointer 99 indicates the reading in full hundred inches on the scale 125. As the rotor 88 is driven through gearing and clutches by the shaft 91, the stop plate 127 will strike the stop pin 96 and the clutch mechanism within the casing 86 will act to reverse the direction of the rotor 88 until the abutment 94' normally strikes the plate 124 when the clutches will again act to reverse the direction of travel of the wheel. However when solenoid 133 acts to interpose the retractable stop 128, the rotor 88 will only travel a short distance until the stop plate 127 strikes this stop 128 when it will again cause rotor 88 to reverse. The rear side of rotor 88 carries a cam 97 with two spaced inclines which successively engage switch actuator 98, which in turn tilt angle brackets 98' to successively operate a pair of electric microswitches 100, 101 housed within a casing 102. One of these switches controls the change in speed of the wheel 3 while the other controls the measuring cycle.

The main length measuring unit 86 is drivingly connected to the wire stock feed wheel by means of a pinion 104 secured to one end of the shaft 25 and which meshes directly with the ring gear 19, and a differential 105 which has its input shaft 106 drivingly connected to the opposite end of the shaft 25 by an endless drive 107 while its output shaft 108 is connected to the drive shaft 91 of the unit 86 by another endless drive 109, as shown in Fig. 15. The cage 115 has gear teeth 116 on one side which mesh with a pinion 117, and the differential 105 has gears 110, 111 secured to the adjacent ends of the shafts 106, 108 respectively and which mesh with bodily movable offset gears 112, 113 carried by a pair of shafts 114 mounted in the rotary cage 115. The pinion 117 is coupled to a smaller gear 118 meshing with still another gear 119 secured to a shaft 119' having thereon a freely swingable arm 120 carrying one member of a one-way clutch 122 the other member of which is fastened to the shaft 119' and is engaged by the brake 121, see Figs. 15, 16 and 17.

The shaft 119' is a secondary drive shaft through the differential 105 to "Cyclo-Monitor" 86 and permits input of a fractional inch count to the rotor 88 from the cam cluster on shaft 145, through a link 135 and the arm 120 at a time when no feeding by feed wheel 3 takes place. It is thus clear that any fractional cutting length can be obtained by adding a fraction to the movement input of the "Cyclo-Monitor" 86.

The auxiliary or fractional length measuring unit 87 is connected to the cam 138 by the shaft 137 and a lever 136 is pivoted on this shaft and is connected by a link 135 to the arm 120 as shown in Figs. 18, 19 and 20.

The lever 136 is power operated from cam 159 and plunger 169 through an offset lever 139 and a link 134, and is spring returned until the roller 123 stops against the cam 138 thereby limiting the stroke to that set up on the unit 87.

The automatic counter 141 is operated from a cam 158 and a plunger 168, and a push link 140 which is pivoted and slidably mounted on the frame 2 and is supported midway by linkage 132 which is connected to the solenoid 133. After the machine has produced the required number of wires the counter 141 causes the mechanism to stop and energizes the solenoid 133 to effect wire stock trimming for the next set up of operations, see Fig. 26. After the square cut initial operation of the next run, the counter is again connected for actuation by action of the cam 157, plunger 167 and slotted link 167'. The drive shaft 13 may be journalled in the cam box 146 and is arranged for connection with the drive 16 by means of the magnetic clutch 59 and may be locked by a magnetic brake 173, see Fig. 5. The shaft 13 carries a worm 143 which meshes with a worm gear 144 secured to a cam shaft 145 also journalled in the cam box 146 carried by the frame 2, see Figs. 5, 19, 20, 21 and 22. Mounted upon one end of the cam shaft 145 is a cam wheel 147 one side of which is provided with a cam 148 for opening and closing the final conductor delivery shelf 74 through the arm 79 and link 80; while its opposite side has a cam 149 for controlling the opening and closing of the wire feed clamp 61 through the shaft 63 and linkage 150, 65 and 66. Adjacent to the cam wheel 147 is a drum cam 151 which is adapted to reciprocate the clamp 61 through the arm 64; and adjacent to the cam 151, the shaft 145 carries a cam 152 for actuating the cutting and stripping blades 60. Beyond the worm gear 144, the cam shaft 145 has a multiple cam rotor 153 secured thereto and which carries a series of six disk cams 154, 155, 156, 157, 158, 159.

The cam 154 coacts with the draw rollers 6 through a plunger 161, a connection 162 and the bell crank 67 and link 68 to open and close the gap between these rolls, and the cams 155, 156 coact with a pair of plungers 163, 164 which actuate limit switches 165, 166 respectively. The machine is also provided with a push-button switch panel 170 and a control relay box 172 as shown in Figs. 1 and 4, for controlling the starting and stopping of the various mechanisms, and compressed air for actuating the several air cylinders 45, 46, 81 may be supplied from any suitable source. The insulated wire stock 21 may also be supplied to the feed wheel 3 from a wire tensioning device 171 as indicated in Fig. 4.

Figure 23:
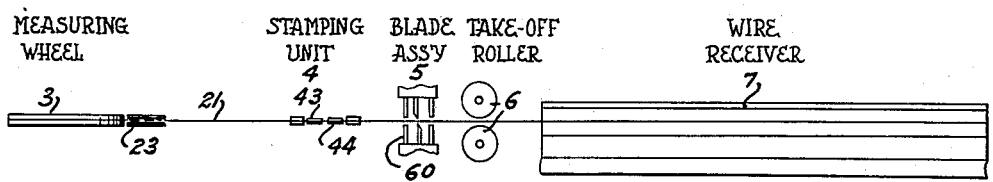
Fig. 23 is a top view diagram showing the path of advancement of the wire from the feed wheel through the several treating zones and onto the final conductor receivers.

When the improved wire length measuring, marking, and cutting and stripping machine has been properly constructed and assembled as hereinabove described, its normal operation while carrying on the steps of the improved method is as follows, specific reference being made to the diagrams of Figs. 23, 24, 25 and to the timing diagram of Fig. 26. This timing diagram represents one complete cycle of operations after the wire feed or input wheel 3 has come to a complete stop and the machine stops at 360°, after going through the complete cycle.

In this position the machine is ready to be set up for the next run, and the operator adjusts the feed wheel to accommodate the new gauge of wire with the aid of the member 29, see Fig. 8. He also inserts the proper stamps 49 and changes the cutting and stripping tool 60 if necessary, and furthermore adjusts the counter 141 for the total number of pieces required in the next run and adjusts the units 86 and 87 for the length of the conductors required. With these adjustments completed, he proceeds to string wire stock 21 around the feed wheel 3 and under the guide wheel 23, through the stamping guides 52, between the separated tools 60 and the open jaws of the clamp 61, and inserts the leading end of the wire stock between the take-off rollers 6, separating the latter momentarily with the aid of the handle 174, whereupon the machine is ready for operation by pressing the starting button on the panel 170.

This pressing of the starting button causes the motor 8 to operate and to set the feed wheel 3 in motion and to simultaneously set the take-off roller 6 in motion. The drive for these rollers 6 will constantly slip in the friction clutch 71, slightly at high speed and to a greater extent at low speed. The starting of the motor 8 will also operate the stamping unit 4 which runs at a uniform speed. Therefore it will stamp the wire at closer intervals when the wire stock is fed at low speed than when this stock is fed at higher speed.

When the machine is first set in motion by pressing the starting button, the drive to the feed wheel is in low speed through the clutch 35, and after the wheel advances about twelve inches of wire stock and several sets of markings have been applied to the advancing wire and the first stamping has passed the central cutting blade 60, the leading end of the wire is ready to be cut square and stripped. Meanwhile the rotor 88 of the unit 86 has backed up with its stop 127 striking the retractable stop 128 and then the direction of the rotor 88 reverses and cam 97 causes the switch 101 to initiate the cutting and stripping cycle by interrupting the current to the clutch 35 and energizing the brake 18 to stop and lock the feed wheel 3. Simultaneously with this interruption of the current to the clutch 35, the current to the brake 173 and energizing clutch 59 is also interrupted, thereby stopping the stamping press or unit 4 through a solenoid and pin clutch combination as previously described. As the cam shaft 145 with the associated cams begins to revolve, the feed clamp 61 approaches the tools 60 and clamps the wire 21 while these tools cut through the wire and insulation. The clamp 61 then moves toward the right away from the tools 60 and strips the insulation from the scrap piece after which the clamp opens and returns to the left of the tools and again clamps the wire stock 21.

After this clamping operation the clamp 61 moves toward the left thus stripping the leading end of the wire stock which becomes the leading end of the first conductor to be produced. The tools 60 will then separate and the clamp 61, while still clampingly engaging the wire, advances toward the right and inserts the stripped end of the wire stock between the separated rollers 6 which thereafter promptly close and pull the wire stock as the clamp 61 again opens. These rollers 6 had been separated previously to permit escape of the small length of wire scrap and the limit switch 165 had caused the feed wheel 3 to start again in slow speed to supply wire stock 21 needed by the advancing clamp 61. The limit switch 165 in the meantime has also energized the stamping solenoid to start the unit 4 in operation and the cam 159 through the plunger 169, link 135 and differential 105 has advanced the rotor 88 of the length measuring unit 86 the required fraction of an inch required in addition to full inches in each final conductor, and the retractable stop 128 has been withdrawn as previously described and the unit 86 is now set up to produce the first length of the run while the predetermined counter 141 has also been connected to count the number of conductors to be included in this run.

As the cam shaft 145 approaches its stopping position, the limit switch 166 causes the same to stop by breaking the current to the clutch 59 and by energizing the brake 173. This action of the switch 166 also causes the feed wheel 3 to change from slow speed to high speed by breaking the current to the magnetic clutch 35 and energizing the clutch 34, and as the stamping unit 4 operates at constant speed the stampings will naturally be farther apart and the roller 6 will cooperate with feed roll 3 to constantly maintain the wire taut so as to produce accurate lengths as measured out by the feed wheel 3 and with the aid of the "Cyclo-Monitor" or measuring unit 86. The rollers 6 also propel the forward stripped end of the stamped wire into and along the closed discharge means 72.

As the wire stock is fed along and passes the half-way mark for each length, the striker plate 94 associated with the rotor 88 of the unit 86 will engage the stop plate 124 and reverse the direction of travel of the rotor 88, and when the wire nears the end of the length of the conductor to be produced, the front bevelled end of the cam 97 carried by the rotor 88 will trip the switch 100 through the slide 98 and angle bracket 98'. This causes a reversal of the driving clutches 34, 35 and the wheel 3 then changes to slow speed thereby causing closer spacing of the stamping on the wire adjacent to the end of the conductor. After a sufficient number of close stampings have been affixed, the cam 97 approaches the slide 98 with its second bevelled end and this causes further depression of the angle bracket 98' whereupon the switch 101 is actuated and the stop plate 127 strikes the pin 96 thus again reversing the rotor 88.

This tripping of the switch 101 causes an interruption in current to the clutch 35 and also causes the brake 18 to become effective. Simultaneously with this action the stamping unit 4 will stop, the cam shaft 145 becomes operative as previously described, and the machine will cut the required wire length while the clamp 61 will proceed to strip the trailing end of the conductor being produced, whereupon the clamp 61, the rollers 6 and the upper shelf 74 open up to drop the first finished conductor onto the intermediate shelf 75. The clamp 61 meanwhile moves to the opposite side of the tool 60 and strips the leading end of the second wire and guides the same between the roller 6 as previously described, and the feed wheel 3 again starts to pay out wire stock 21 at high speed and the unit 4 resumes stamping at long spacings.

This cycle of operations is repeated with respect to each of the successive length of wire severed from the longitudinally advancing stock and the precise timing and functioning of the various parts of the mechanism are clearly illustrated in the timing diagram of Fig. 26. Each final conductor is of precisely the predetermined overall length as determined by the measuring units 86, 87, has its opposite ends stripped for a distance determined by the spacing of the insulation cutting blades from the wire severing knife, and is provided with identifying indicia off-set with respect to those at the top and bottom of each section and which are more closely spaced near the stripped ends than at the mid-portion of each conductor.

The rollers 6 constantly keep the advancing wire taut beyond the marking device 4 but slight sagging of the wire stock may occur in advance of this device while stripping of the leading end of this stock is being effected by the clamp 61, and these rollers 6 also insure final delivery of straight conductors to the shelf 74 through the guide tube 72 and from this shelf to the support 75 and trough 76. These rollers 6 furthermore frictionally engage the stamped wire sections remote from the stamped indicia and thereby prevent possible marring of these indicia; and by separating the rollers 6 whenever the clamp 61 is introducing the severed wire end therebetween, undesirable bending of the wire stock is definitely avoided.

From the foregoing detailed description it will be apparent that the present invention provides a simple method of producing electrical conductors from a continuous supply of longitudinally advancing insulated wire stock, each conductor having spaced identifying indicia thereon, being of precisely the same length, and having the insulation stripped from its opposite ends. The invention also provides efficient mechanism for automatically exploiting the improved method with utmost precision, and for rapidly producing premeasured conductors of any desired length which can be conveniently adjusted to produce any predetermined number of conductors of a desired length without excessive waste of wire stock. By staggering the applied indicia and applying them more closely to the stripped end portions of the conductors than at the medial portions thereof, the final product can be effectively utilized in cramped localities with numerous conductors bunched as is necessary especially in the aircraft industry, and the lengths of these conductors may be either in full inches or in fractional inches in addition. The predetermined counter units control the starting and stopping of the machine which may be operated at any desired speed but the low and high speed clutches 34, 35 are automatically operable to produce the close and wider spacing of the markings at the ends and medial portion respectively of each conductor, and the invention has gone into highly successful and satisfactory actual commercial use to produce conductors up to fifteen feet in length.

It should be understood that it is not desired to limit this invention to the exact steps of the method as to the precise construction of the mechanism herein shown and described, since various modifications within the scope of the appended claims may occur to persons skilled in the art.

I claim:

1. In combination, means for longitudinally advancing insulated wire stock along a definite path, means for cutting the wire stock into successive predetermined lengths at one portion of said path of advancement, means for stripping the insulation from the trailing end of each severed length of wire at the zone of cutting and for subsequently also stripping the insulation from the adjacent severed end of the wire stock, said means including a wire clamp for moving the severed trailing end of each wire length away from the zone of severance and for subsequently advancing the adjacent severed end of the wire stock past said zone, a pair of rollers frictionally engageable with each of the successive severed and stripped wire lengths to withdraw the latter from the zone of severance, said clamp being operable to direct the severed end of the wire stock between said frictional rollers, and means for separating said rollers while said clamp is operating to direct the severed end of the wire stock therebetween.

2. In combination, cutting means for severing wire stock fed past a cutting zone into successive sections, means for longitudinally feeding the wire stock through said zone, and common means for controlling the speed of operation of said feeding means and the timing of said cutting means, said common control means being adjustable to cause said cutting means to initially sever a short piece of scrap from the leading end of the wire stock before the successive sections of wire of the desired predetermined lengths are cut from the advancing stock.

3. In combination, cutting means for severing longitudinally advancing wire stock into successive sections at a fixed cutting zone, means for advancing wire stock longitudinally through said zone, and common means for controlling the operation of both said cutting and feeding means to predetermine the precise length of each of the successive severed wire sections and for counting the number of said sections severed from the stock.

4. The method of producing locally marked electrical conductors, which comprises, paying out successive definite lengths of insulated wire from a source of wire stock supply and applying local identifying indicia to diametrically opposite sides of each length, severing the successive marked lengths from the stock, stripping the insulation from each wire length adjacent to the zone of severance, and gripping each severed length at diametrically opposite portions thereof between the applied indicia and withdrawing the gripped lengths from the zone of severance.

5. The method of producing locally marked electrical conductors, which comprises, intermittently feeding successive definite lengths of wire longitudinally from a supply source past a marking zone initially at slow speed then at higher speed and finally at slow speed, and applying local staggered identifying indicia to diametrically opposite portions of each length during equal time intervals at said marking zone to cause the successive indicia to be more closely spaced along each length during its slow speed travel than during its higher speed advancement.

6. The method of producing locally marked electrical conductors from insulation covered wire, which comprises, feeding a length of the wire longitudinally from a supply source past a marking zone initially at slow speed then at higher speed and finally at slow speed, and applying local staggered identifying indicia to diametrically opposite portions of the insulation of the wire length at said marking zone at equal time intervals to cause the successive indicia to be more closely spaced along the opposite ends of the wire length during its slow speed travel than during the higher speed advancement of its medial portion.

7. In combination, mechanism for feeding a length of wire longitudinally from a supply source past a printing zone initially at slow speed then at higher speed and finally at slow speed, and a printing device disposed at said marking zone and being operable to apply local staggered identifying indicia to diametrically opposite portions of the wire length during equal time intervals whereby the successive indicia are applied to the wire length more closely during its slow speed travel than during its higher speed advancement.

8. In combination, mechanism for feeding successive definite lengths of insulation covered wire longitudinally from a supply source past a marking zone initially at slow speed then at higher speed and finally at slow speed, knives located at said zone for severing the successive lengths from the source and for stripping the insulation from the ends of each severed length, a printing device disposed at said marking zone and being operable to apply local staggered identifying indicia to diametrically opposite portions of the medial portion of the insulation on each length during equal time intervals whereby the successive indicia are applied to said insulation of each wire length more closely during its slow speed travel than during its higher speed advancement, and means for periodically actuating said knives to cut and end strip the successive wire lengths beyond the applied markings.

9. The method of producing locally marked electrical conductors from insulation covered wire, which comprises, feeding successive definite lengths of the wire longitudinally from a supply source past a marking zone at slow speed then at higher speed and finally at slow speed applying successively staggered local identifying indicia to diametrically opposite medial portions of the insulation of each wire length within said zone at equal time intervals to cause the successive indicia to be more closely spaced near the opposite ends of each length during its slow speed travel than during the higher speed advancement thereof, and severing the successive wire lengths from the supply source and stripping the insulation from the ends thereof beyond the applied markings.

References Cited in the file of this patent

UNITED STATES PATENTS

| Number | Name | Date |
|---|---|---|
| 266,517 | Ramus | Oct. 24, 1882 |
| 954,751 | Mann | Apr. 12, 1910 |
| 1,260,967 | Chapman | Mar. 26, 1918 |
| 1,677,927 | Pettee | July 24, 1928 |
| 1,791,155 | Aldrich | Feb. 3, 1931 |
| 1,835,801 | Mayhew | Dec. 8, 1931 |
| 1,861,555 | Sheperdson | June 7, 1932 |
| 1,930,219 | Zimber | Oct. 10, 1933 |
| 2,307,046 | Johnson | Jan. 5, 1943 |
| 2,309,728 | Goettsch | Feb. 2, 1943 |
| 2,320,659 | Sahlin | June 1, 1943 |
| 2,321,057 | Weiss | June 8, 1943 |
| 2,425,484 | Murrah | Aug. 12, 1947 |
| 2,611,225 | Williams | Sept. 23, 1952 |
| 2,636,408 | Mitchell | Apr. 28, 1953 |
| 2,649,822 | Penn | Aug. 25, 1953 |
| 2,650,822 | Wyza | Sept. 1, 1953 |
| 2,687,090 | Carroll | Aug. 24, 1954 |
| 2,729,447 | Gross | Jan. 3, 1956 |
| 2,731,750 | Adams et al. | Jan. 24, 1956 |